(12) United States Patent
Cohn

(10) Patent No.: US 6,323,464 B1
(45) Date of Patent: Nov. 27, 2001

(54) MODULE FOR PRODUCING HOT HUMID AIR FOR A PROOFING OR HOLDING OPERATION

(76) Inventor: Robert J. Cohn, c/o Product Solutions, 447 New Grove St., Wilkes-Barre, PA (US) 18702-4720

( * ) Notice: Subject to any disclaimer, the term of this patent is extended or adjusted under 35 U.S.C. 154(b) by 0 days.

(21) Appl. No.: 09/571,638

(22) Filed: May 15, 2000

Related U.S. Application Data

(63) Continuation-in-part of application No. 09/192,345, filed on Nov. 16, 1998.

(51) Int. Cl.[7] ........................................................ A21B 1/00
(52) U.S. Cl. ........................... 219/401; 219/400; 126/214; 126/369; 99/467; 99/331
(58) Field of Search ..................................... 219/201, 400, 219/401; 126/21 A, 369, 348; 99/467, 331, 468, 330, 473–476

(56) References Cited

U.S. PATENT DOCUMENTS

| | | | |
|---|---|---|---|
| 4,426,923 | * | 1/1984 | Ohata ...................................... 99/468 |
| 4,906,485 | * | 3/1990 | Kirchhoff .............................. 426/506 |
| 5,140,120 | | 8/1992 | Kasai . |
| 5,782,174 | | 7/1998 | Cohn . |
| 5,802,963 | * | 9/1998 | Cohn et al. .............................. 99/476 |

\* cited by examiner

Primary Examiner—Teresa Walberg
Assistant Examiner—Shawntina T. Fuqua

(74) Attorney, Agent, or Firm—Hopgood, Calimafde, Judlowe & Mondolin LLP

(57) ABSTRACT

A module adapted to generate a stream of hot and humid air, operating in conjunction either with a proofing chamber in which dough pieces are raised prior to baking or in conjunction with a holding chamber in which cooked food is maintained in a hot, moist state. The module is provided with a replenishable water reservoir from which water is fed into a steam generator in which the water is boiled to generate steam. Included in the module is a duct through which air is forced by a blower and an air heater disposed in the duct is used to heat the air. A conduit connects the steam generator to the duct and allows exhaust of steam into a positive-pressure zone (high pressure, after the blower) to effect a proofing action when the module is operated in proofing mode. Steam can also be fed into a low-pressure zone in the duct (at the blower inlet) to produce a stream of hot and humid air at a higher temperature whereby the module is operated in a food holding mode. Steam can also be exhausted in to both section (high pressure and low pressure) simultaneously. A water tank with an associated heater is used to generate the steam, and has an electrical connector so that tanks can be replaced or removed without opening or accessing the food holding compartment (whether such is used for holding or proofing). The configuration of the tank can be altered to provide less steam for proofing and more steam for holding food, by either a movable barrier in the tank separating a reservoir section from a steam generating section, or by providing a top to the tank having molded thereinto a barrier in a fixed position. A desired control scheme for controlling the temperature, humidity, and/or water level is provided based on the temperature, humidity, barrier position, and/or water level.

25 Claims, 12 Drawing Sheets

MODULE FOR PRODUCING HOT HUMID AIR FOR A PROOFING OR HOLDING OPERATION

This application is a Continuation-in-part Ser. No. 09/192,345, filed Nov. 16, 1998.

BACKGROUND OF INVENTION

1. Field of Invention

This invention relates generally to a module for producing a stream of hot and humid air, and more particularly to a module of this type adapted to operate in conjunction either with a proofing chamber in which dough pieces are raised prior to baking, or to operate in conjunction with a holding chamber in which cooked food is maintained in a hot and moist state suitable for serving, and to a module having a removable water pan with integrated electrical connection, and so a module having a humidity control.

2. The State of the Art

Proofing refers to a process by which pieces of yeast dough shaped to form bakery products are raised or enlarged preparatory to their being baked. Thus pastries, rolls, breads and other bakery products must undergo proofing before being put in an oven to be baked. When dough intermixed with live yeast is placed in a warm, moist environment, carbon dioxide is then internally generated throughout the body of the dough to create myriad gas pockets. These gas pockets enlarge or raise the dough and also alter its texture.

When the proofed dough is baked, the resultant product is lighter and more chewy than dough products which are not raised prior to baking. Thus croissants, doughnuts, pan pizzas, rolls and breads must be properly proofed before being baked. Proofing therefore is the process by which the shaped yeast dough pieces are subjected to a moist, hot-air environment to raise the pieces, and a proofing cabinet is a chamber in which proofing takes place.

It is vital that the atmosphere in which proofing takes place within a cabinet be properly controlled to avoid underproofing or overproofing. Thus should the dough pieces receive excessive heat, they will rise too fast, thereby producing large gas pockets that cause the pieces to collapse during baking. On the other hand, insufficient heat results in dough pieces that are not fully raised, and when these pieces are baked they will have a doughy core. Excessive moisture in proofing causes the product to have a mushy surface, while insufficient moisture renders the surface of the baked product tough and rubbery.

A module of the type disclosed in our above-identified copending application is highly effective in supplying a stream of hot, humid air to a proofing chamber in which the dough pieces in the chamber must be raised prior to baking.

But there is also a need for a stream of hot, humid air to be fed into a holding chamber. This chamber is similar to a proofing chamber, but it acts to maintain food that had already been cooked or baked in a hot and moist state until such time as the food must be served.

Thus in the dining halls of a large hotel at a convention attended by hundreds of guests, it is there necessary to serve dinner to all of these guests at a single sitting. However, as a practical matter it is not possible to provide kitchen facilities large enough to prepare these meals all at about the same time and to then serve these hot meals to the assembled guests.

In order to overcome this problem, the present practice in a hotel or other facility that has dining accommodations capable of serving a considerable number of guests is to prepare well in advance of the scheduled serving period, the required number of hot dinner plates. For example, if it is necessary to serve at a single sitting in a hotel dining hall five hundred hot plates, and the kitchen facilities of this hotel has a maximum cooking capacity of fifty hot plates, then several hours before the scheduled dining period, all five hundred hot plates are prepared in successive sessions.

In order to maintain these prepared hot food plates for several hours in a hot and moist condition suitable for serving, use is made for this purpose of holding cabinets. A holding cabinet is similar to a proofing cabinet in that it includes racks or shelves to support the pans, dishes or plates carrying the hot food. But while both in a proofing cabinet and in a holding cabinet, the atmosphere must be hot and humid, in a holding cabinet the necessary temperature is higher. Typically, in a proofing operation, the desired temperature level is about 80° F. to about 130° F., while the required relative humidity can be as low as about 70 percent or as high as about 95 percent. In a holding operation, the necessary temperatures to hold the cooked food at a temperature level suitable for serving is in a range of about 140° F. to about 180° F., and the relative humidity is in the range of about 20 to 90 percent.

In both a proofing and a holding operation it is essential that the relative humidity of the atmosphere be adjustable to satisfy the existing requirements for the dough or the cooked food being processed. This requirement is more difficult to meet in a holding cabinet in which the hot food being held therein dictates for the purpose a higher air temperature than in a proofing operation, yet a relative humidity that will maintain the moisture of the cooked food. Where the cooked food is say fried chicken that is somewhat dry, then the required relative humidity of the holding atmosphere is low, but if the cooked food is broiled fish, then a higher relative humidity is needed to maintain the fish in a moist state.

The relationship of air temperature to its relative humidity plays a significant role in the operation of a module for producing a stream of hot, humid air. It is important therefore that this relationship be understood. The "absolute humidity" is the weight of water in a pound of dry gas (the gas being air for the present purposes). When the partial pressure of water vapor in the gas reaches the vapor pressure of water at the same temperature, the air is saturated ("saturation humidity"). "Relative humidity" H (or "percent relative humidity") is the ratio, in percent, of the partial pressure of water to the vapor pressure of water at that temperature; i.e., the percentage of moisture actually in the air (its absolute humidity) to the moisture it would hold if it were saturated at the same air temperature and pressure. This saturation point, which represents the capacity of air to hold water vapor, increases as the temperature of air rises. Thus cold air, though it usually has a low moisture content, can have a high relative humidity with only a relatively small amount of water, for this cold air is almost saturated with respect to the maximum amount of water vapor it is capable of holding at such a cold temperature. But when the air is at a high temperature, it must then have relatively a very high moisture content to exhibit a high relative humidity.

If, therefore, in a module to produce a stream of hot and humid air one injects steam into a hot air stream to render it humid, the resultant percentage of relative humidity depends on the temperature of the air. For a given weight of injected steam, the relative humidity will be low if the temperature is elevated and will be higher if the temperature is lower.

In a module of the type disclosed in my prior U.S. Pat. No. 5,802,963 entitled "Module for Producing Hot Humid Air"

1 water from a replenishable reservoir is fed into a steam generator having an electric heater. Steam from this generator is injected into a duct in which an air blower draws in air through the inlet to the duct and blows it through an air heater to produce a humid, hot air stream which is exhausted from the outlet of the duct. The relative humidity of this stream depends on the amount of steam injected therein and the temperature of the air. Though with this module it is possible to adjust the temperature of the air stream as well as its relative humidity, we have found that it is not possible when operating in conjunction with a holding chamber to provide an atmosphere for this chamber that is appropriate for certain food holding conditions, such as an atmosphere whose air temperature is well above 130° F. and whose relative humidity exceeds 50 percent.

As previously noted, more water vapor is required to produce a high relative humidity at higher temperatures. Thus if the air temperature is 130° F. and a certain amount of steam is injected into the heated air to impart a high relative humidity thereto, for the same amount of steam and an air temperature of 150° F. the relative humidity will then be substantially lower. The difficulty with the module disclosed in my prior patent is that it is unable to supply to the hot air stream whose air is at an elevated temperature the amount of steam needed to produce a high relative humidity. Hence the module, though capable of providing an atmosphere that is appropriate for wide range of conditions encountered in proofing, cannot provide an atmosphere that is appropriate for a wide range of holding conditions.

SUMMARY OF INVENTION

In view of the foregoing, the main object of this invention is to provide a module for efficiently generating a stream of hot and humid air, the module operating in conjunction either with a proofing chamber or a holding chamber.

More particularly, an object of this invention is to provide a module of the above type which is operable either in conjunction with a proofing chamber in which yeast dough pieces are subjected to a stream of hot and humid air to effect raising of the pieces, or in conjunction with a holding chamber in which cooked food is maintained in a hot and moist state in condition for serving.

Among the salient advantages of a module in accordance with the invention are the followings:

A. The temperature of the air discharged from the module and its humidity are readily controllable to maintain the desired atmospheric conditions in the interior of the proofing or holding chamber to which the module is coupled.

B. The water in the module which is to be converted into steam is stored in a replenishable reservoir coupled to a water pan in an adjacent steam generator having a water heater element therein.

C. When water in the reservoir runs low, it may be replenished without having to open the door of the proofing or holding chamber to obtain access to the reservoir and disturbing the moist atmosphere therein.

D. In the module in which steam is intermingled with a stream of hot air by injecting the steam into this stream, it is possible to control the humidity of the resultant humid stream simply by reducing the power supplied to the water heater in the steam generator, no other adjustment being necessary.

E. The tank holding the water has a barrier which can be moved to define whether the module is used for proofing or holding, and preferably the module includes a control system that senses the barrier position and operates the module accordingly.

Briefly stated, these objects are attained by a module adapted to generate a stream of hot and humid air, operating in conjunction either with a proofing chamber in which dough pieces are raised prior to baking by being subjected to this stream, or in conjunction with a holding chamber in which cooked food is maintained in a hot, moist state in condition for serving. The module is provided with a replenishable water reservoir from which water is fed into a steam generator in which the water is boiled to generate steam. Included in the module is an air duct having an inlet which feeds incoming air through a blower and an air heater toward an outlet whereby air drawn into the duct through the inlet by the blower is heated to produce a stream of hot air that is exhausted from the outlet. A steam tube coupled to the steam generator injects steam into a positive-pressure zone in the duct beyond the blower therein to intermingle with the stream of hot air to produce a stream of hot and humid air which when the module operates in conjunction with a proofing chamber is fed therein to effect a proofing action.

Steam from the steam chamber alternatively, or in combination, is fed into a low-pressure zone in the duct in advance of the blower therein to produce a stream of hot and humid air having a higher temperature, whereby when the module operates in conjunction with a holding chamber, the hot humid air effects a holding action for consumption.

In brief, the invention comprises a module adapted to generate a stream of hot, humid air useable in conjunction with a dough proofing chamber or a cooked food-holding chamber to provide an atmosphere appropriate to the chamber, the module comprising (i) an air duct having an air intake and an air outlet, (ii) a blower disposed in the duct to blow a stream of air drawn from the inlet to the outlet, the blower creating a low-pressure zone at its inlet and a high pressure zone at its outlet, (iii) an electric air heater in the duct to heat the stream of air, the air heater preferably after but also optionally or additionally before the blower, (iv) a steam generator comprising a tank for holding water, a water heater for heating water held therein, and a connector for electrically connecting the water heater to a power supply, the steam generator being attachable to and removable from the module, (v) a receptacle for engaging the connector, and (vi) means for feeding steam generated in the tank into the duct to provide said atmosphere of a hot, humid air.

BRIEF DESCRIPTION OF DRAWING

For a better understanding of the invention, as well as further features thereof, reference is made to the detailed description thereof to be read in connection with the annexed drawings wherein.

DESCRIPTION OF SPECIFIC EMBODIMENTS

The Module and Proof in Chamber Assembly

Figure 1:
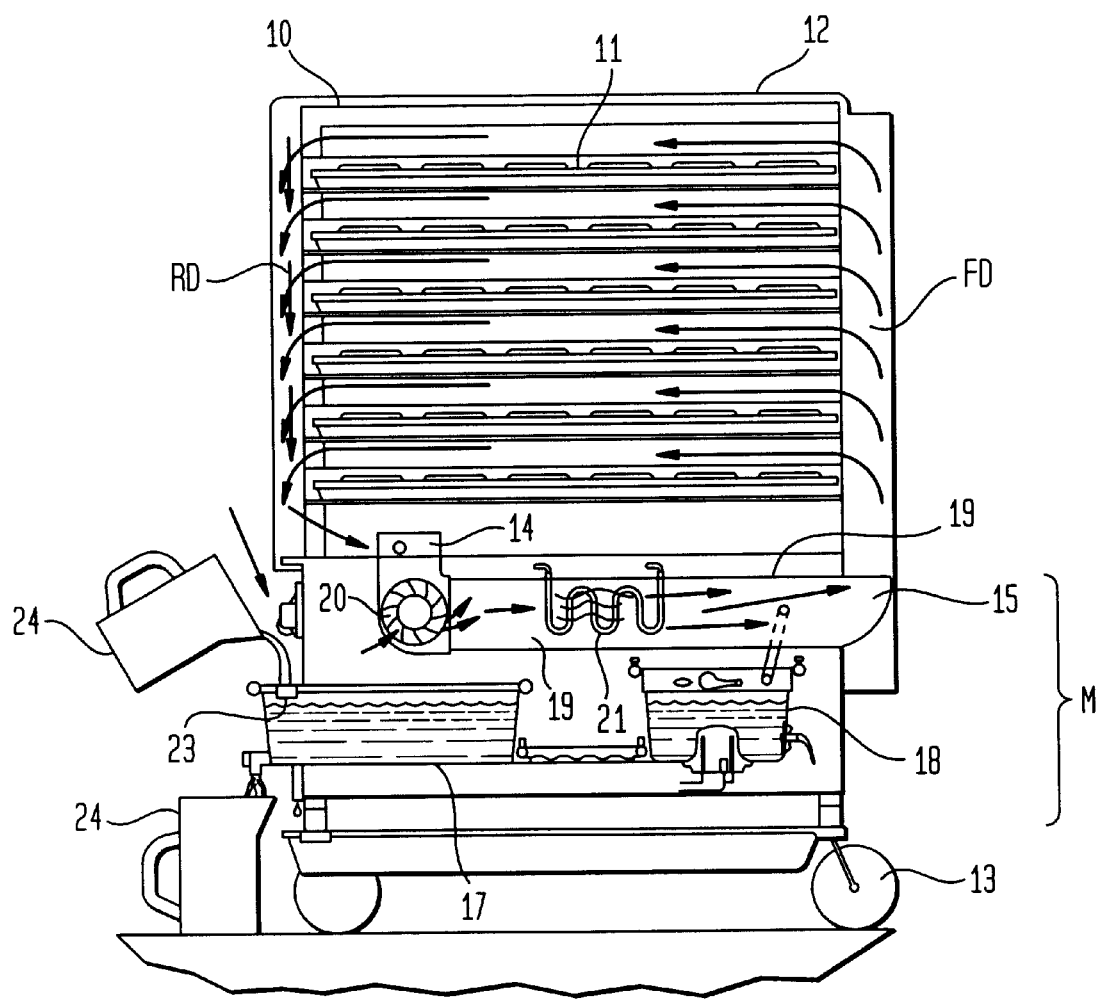
FIG. 1 schematically illustrates a module in accordance with the invention operating in conjunction with a proofing chamber in which pieces of yeast dough are subjected to an atmosphere of hot, humid air discharged from the module.
Figure 2:
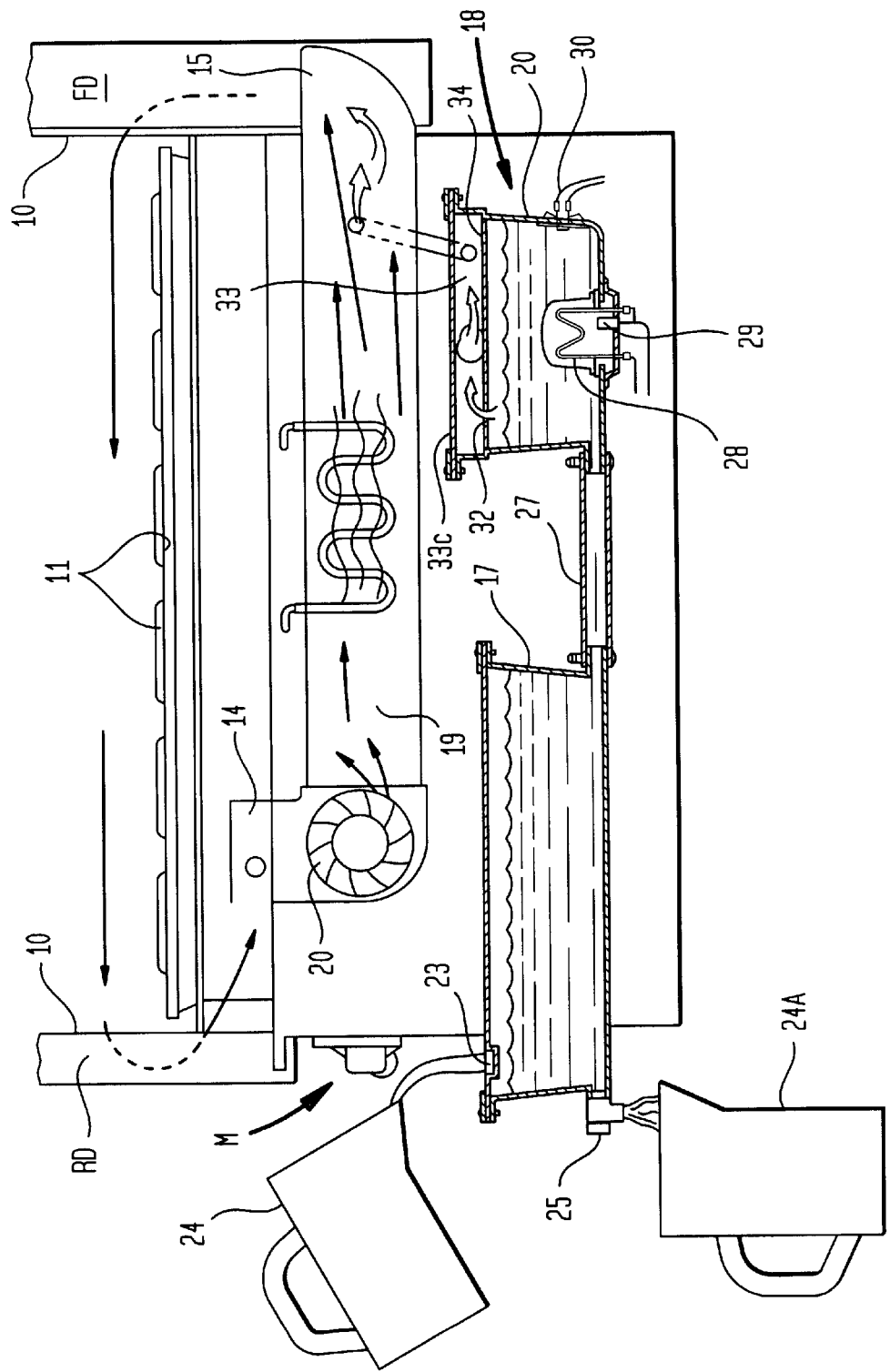
FIG. 2 is an enlarged view of the module and the lower portion of the proofing chamber.

Referring now to FIGS. 1 and 2, there is shown an assembly for converting a multi-level baker's rack 10 into a chamber for proofing shaped yeast dough pieces contained in pans 11 loading the rack. The assembly is composed of a soft hood 12 formed of synthetic plastic sheet material and a module M in accordance with the invention for generating hot, humid air to be recirculated throughout the proofing chamber defined by the hood.

Rack 10 includes a frame formed by vertical and horizontal metal rods welded or riveted together to form a parallelepiped structure having casters 13 attached to the lower ends of the vertical rods so that the rack may be wheeled to any desired site.

Bridging the vertical rods of the frame which form the parallel sides of the frame is a vertical array of equally-spaced metal angle strips forming multi-level slides for receiving the pans 11 carrying the pieces of yeast dough to be proofed. In practice, rack 10 may be a standard baker's rack or a standard rack modified to better accept the soft hood.

Received in the base section of rack 10 is a module M in accordance with the invention which generates the hot, humid air that is recirculated throughout the proofing chamber. Module M includes an air intake 14 which is coupled to a return duct RD in the proofing chamber created by the space between rack 10 and the front end wall of hood 12. Also include in module M is an exhaust vent 15 from which hot, humid air is discharged into a feed duct FD created by the space between the rear end of hood 12 and rack 10.

It will be seen in FIG. 1 that all levels of baker's rack 10 are occupied by pans 11 carrying shaped pieces of yeast dough to be proofed, and that below the stack of pans at the base of the rack is module M which emits from its exhaust vent 15 a stream of hot, humid air which is blown into feed duct FD.

Within module M which fits into the base of rack 10 is a blower 20 which blows air drawn from air intake 14 through an electric heater element 21, the resultant hot air passing through a mixing zone Z before being discharged from exhaust vent 15. Injected into this mixing zone is steam produced by a steam generator, hence the hot air is rendered humid.

Blower 20 within the module therefore creates a low pressure at its intake 14 which communicates with return duct RD and a positive pressure (high pressure zone; relatively higher than at the blower inlet) at exhaust vent 15 which communicates with feed duct FD of the proofing chamber. Mixing zone Z is therefore subject to positive pressure.

As shown by the arrows in FIG. 1 a stream of hot, humid air discharged under positive pressure into feed duct FD from the exhaust vent 15 of the module passes from the feed duct across the dough pieces in pans 11 at every level of rack 10 toward return duct RD. The volume of hot, humid air is substantively the same at every level of the rack. The flow into return duct RD which is under low pressure causes the stream of hot, humid air, after having subjected the dough pieces to a proofing environment, to be sucked back into the module through air intake 14 to produce a stream that is continuously recirculated in the proofing chamber.

Thus module M in combination with multilevel rack 10 and soft hood 12 covering the rack acts to develop within the proofing chamber a circulating flow loop in which hot, humid air continuously flows concurrently through all levels of the rack to uniformly proof the dough pieces supported on each of these levels. Hence all pieces are proofed to the same degree, no piece being overproofed or underproofed.

The Module

Figure 3:
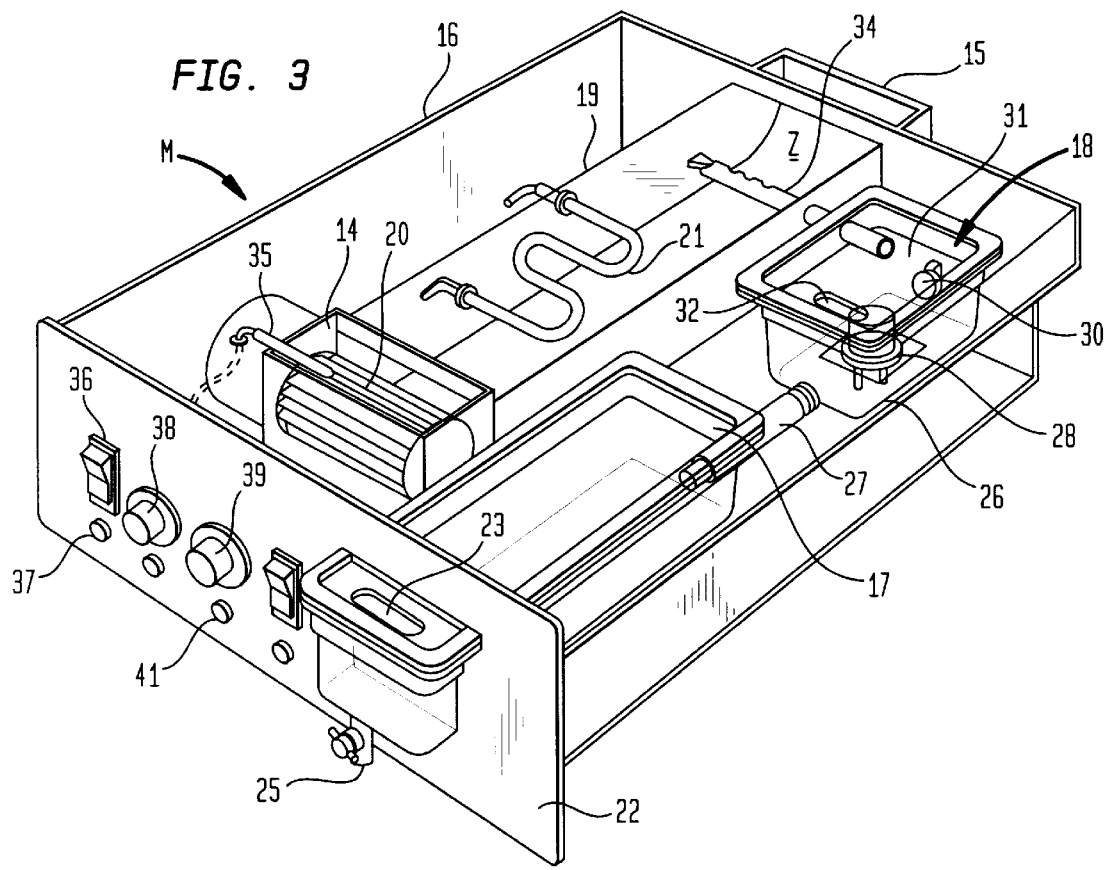
FIG. 3 is a perspective view of the actual module.
Figure 7A:
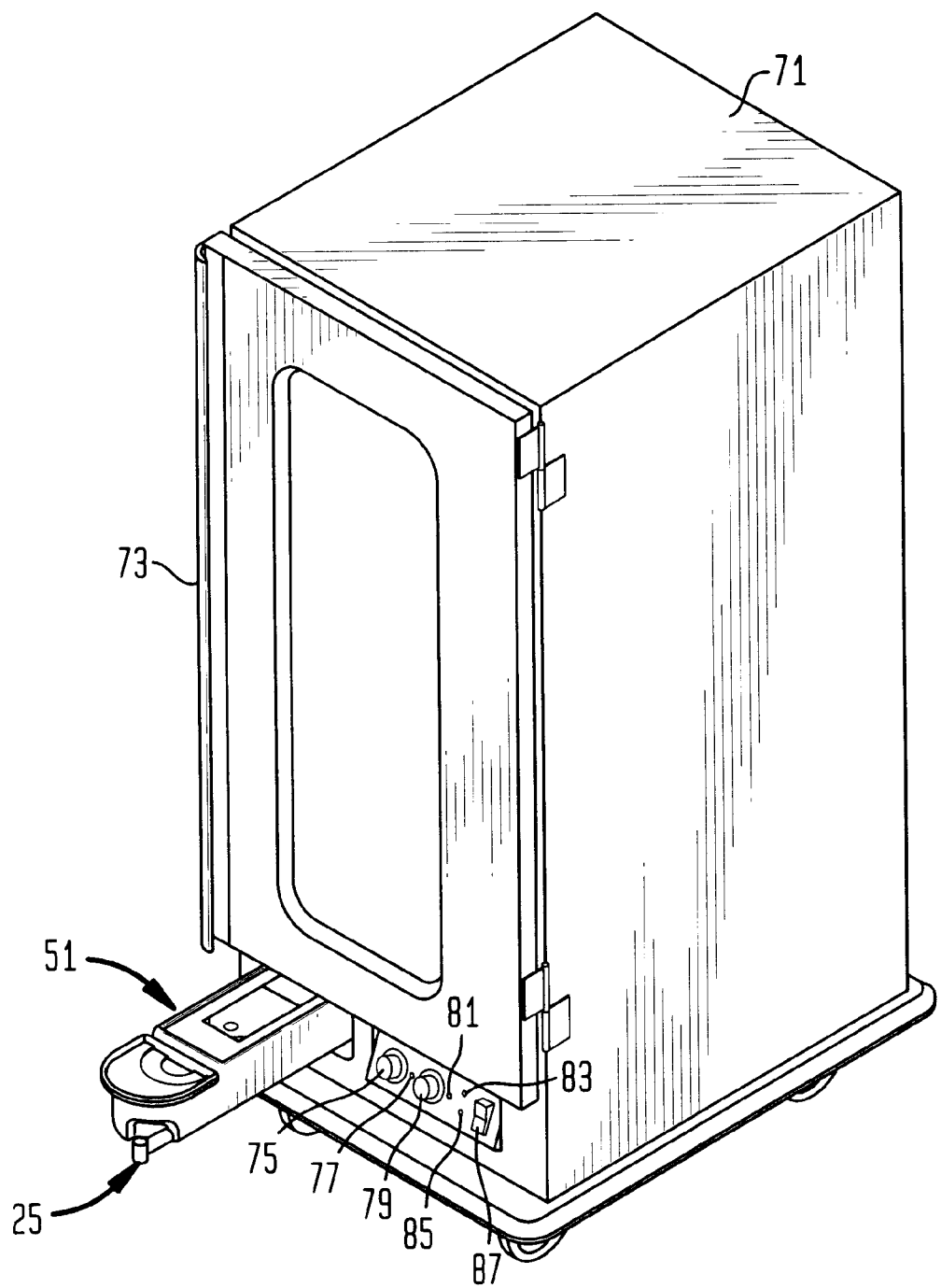
FIGS. 7A, 7B, 7C, 7D, 7E, and 7F depict perspective and cutaway views of different embodiments of a removable water tank used with the instant module.

In an actual embodiment of a module in accordance with the invention as illustrated in perspective in FIGS. 3 and 7A, it will be seen that one longitudinal section of the rectangular casing 16 which houses the module is occupied by a water reservoir 17 and an adjacent steam generator 18. Occupying a parallel longitudinal section of casing 16 is an air duct 19 within which is motor driven blower 20 and an electric air heater element 21. The air intake 14 at one end of duct 19 leads air into blower 20 and the blown air which passes through heater element 21 and a mixing zone Z is exhausted from the duct through exhaust vent 15.

In order to reveal all of the components which make up the module, in the schematic showing in FIGS. 1 and 2, the air duct 19 and the components therein are placed above water reservoir 17 and steam generator 18 which is not the actual arrangement which is illustrated FIG. 3.

Water reservoir 17 is in the form of a rectangular tray molded of transparent synthetic plastic material, such as an acrylic plastic. The front end of the reservoir projects out of an opening in the front panel 22 of the module. The reservoir is sealed by a top cover having at its front end an inlet 23 into which can be poured water to replenish the supply. Thus FIG. 2 shows a pitcher 24 feeding water into reservoir 17 through inlet 23. The level of water in reservoir 17 is visible through its transparent front end; hence one can tell when the water level is low and requires replenishment. And there is no need to open the proofing chamber in order to add water to the reservoir.

The projecting front end of reservoir 17 is provided with a drain valve 25 so that by opening this valve one can drain into a pitcher 24A all of the water contained in reservoir 17 and in steam generator 18.

Steam generator 18 includes a water pan 26 coupled by a feed pipe 27 at its base to the base of reservoir 17. Hence the level of water in pan 26 is the same as that in reservoir 17, the level being progressively reduced as water is boiled off. Reservoir 17 has a much larger water capacity than pan 26, and while the water in pan 26 is raised to an elevated temperature, because the pan is coupled to the reservoir by feed pipe 27 having a relatively small diameter, the water in reservoir 17 remains cool and there is little loss of heat from the steam generator.

Anchored at the base of water pan 26 is an electric water heater element 28 provided with a temperature sensor 29. Mounted on a side wall of pan 26 is a pre-heat thermostat 30. In practice, heater element 28 may be a 700 watt electric heater which is capable of quickly bringing the water in the pan to its boiling point.

Pan 26 is covered by a baffle plate 31 having an opening 32 therein which vents steam generated in the pan into a small steam chamber 33 above the pan provided with a top cover 33C. But because the steam in chamber 33 is exhausted into air duct 19, there is no pressure build-up in the chamber.

Air drawn into air intake 14 by blower 20 is blown, as shown by the arrows in FIG. 2, through electric air heater element 21 to produce a hot air stream that flows through mixing zone Z toward exhaust vent 15 at the outlet end of air duct 19. Air heater element 21 is preferably in the form of an undulating resistance element which emits infrared energy over an extended area in the direction of air flow.

Steam from steam chamber 33 in steam generator 18 is fed into mixing zone Z in the air duct by a steam tube 34.

As best seen in FIG. 3, steam tube 34 which bridges the side walls of duct 19 is provided with a row of holes h, each of which injects steam in the direction of air flow in zone Z where the injected steam intermingles with the hot air stream. Thus the stream of hot, humid air emerging from exhaust vent 15 and fed into feed duct FD of the proofing chamber has a high humidity level. The holes h in steam tube 34 are sufficiently large as to cause all of the steam carried by this tube to exit into mixing zone Z. Hence there is no pressure build-up in steam chamber 33 or elsewhere in the module.

Because the hot air stream is rendered humid just after it flows past air heater element 21, the air is then at Its highest temperature and is capable therefore of accepting the maximum volume of moisture. Relative humidity is the ratio in percent of the moisture actually in the air to the moisture it would hold if it were saturated at the same temperature and pressure. A module in accordance with the invention is capable of providing a high percentage of relative humidity, the percentage being adjustable to satisfy existing proofing requirements.

Heater element 21 heats up all components within air duct 19, hence no condensation is formed therein. The temperature of the air intake above blower 20 is sensed by a thermostatic sensor 35.

Figure 4:
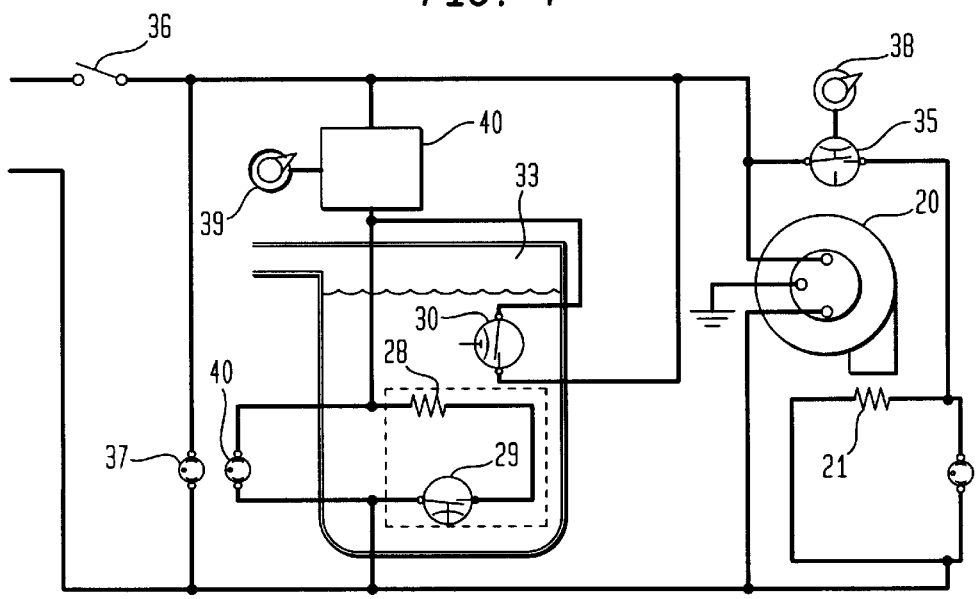
FIG. 4 is a schematic diagram of the electrical circuit of the module.

On front panel 22 of the module is a power switch 36 and a neon light 37 to indicate when the switch is turned on to apply, as shown in FIG. 4~117 vAC power to the blower 20 as well as to the air heater element 21 and water heater element 28 of the module.

Power applied to air heater element 21 is adjustable by means of an air-temperature control knob 38 associated with air thermostat sensor 35. Humidity control is effected by a control knob 39 associated with a variable resistor or triac 40 which varies the power applied to water heater element 28 of the steam generator. A neon light 41 indicates when the water heater is turned on.

When the module is first turned on full power is applied to water heater element 28 to hasten the production of steam. But when the water in pan 26 of the steam generator reaches a temperature of 190° F., then pre-heat thermostat 30 which senses the water temperature is activated and the amount of power then applied to heater element 28 is determined by humidity control knob 39 and triac 40. In practice, the circuit of the module is such as to switch on air blower 20 only when steam generator 18 begins to produce steam.

When air heater element 21 and water heater element 28 of module 19 are both turned on, water contained in pan 26 of the steam generator supplied thereto by reservoir 17 is boiled to produce steam that is collected in steam chamber 33. Steam from chamber 33 is injected by tube 34 into mixing zone Z in air duct 19 in the direction of air flow whereby the steam ejected from the row of holes h intermingles with the hot air stream to produce a hot, humid air stream which is discharged from exhaust vent 15. This hot, humid air stream is suitable for proofing yeast dough or for any other application requiring an atmosphere of hot, humid air whose temperature and relative humidity are controllable to satisfy operating criteria. The level of water in reservoir 17 is visible so that when the level is low an operator can then add water to the reservoir without however having to open the door to the proofing chamber to obtain access to the reservoir, for inlet 23 to the reservoir is outside the proofing chamber. Should it have been necessary to open the door to the proofing chamber, ambient air would then intermingle with the hot, humid environment of the chamber interior and disturb this environment. When it becomes necessary to clean and delime the water system of module M, all of the water in the reservoir and in the pan of the steam generator can be drained from the module simply by opening drain valve 25 which is outside of the proofing chamber and therefore does not require that the proofing chamber be opened to obtain access to the module.

Holding Chamber Module

Figure 5:
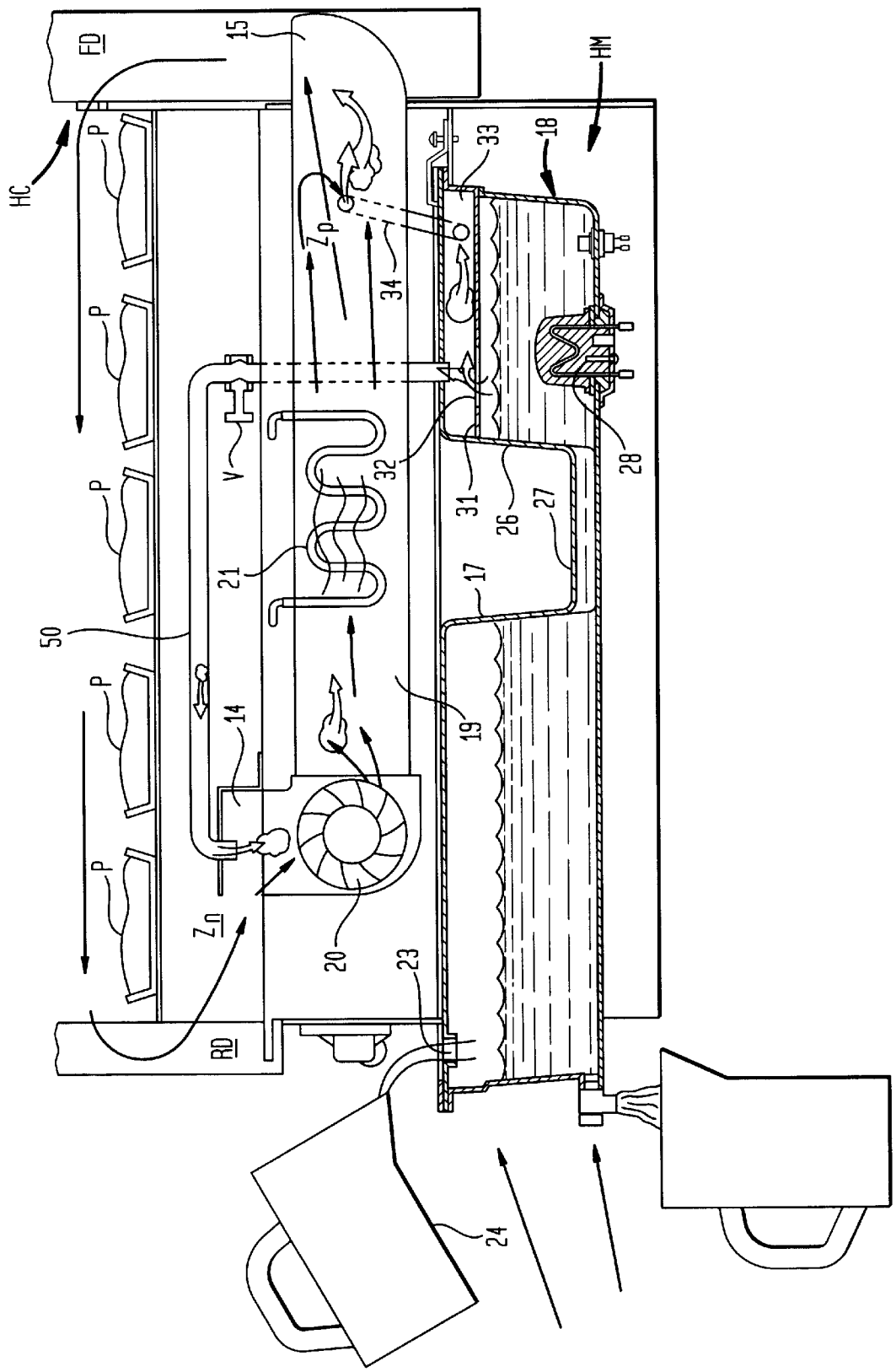
FIG. 5 illustrates a module in accordance with the invention operating in conjunction with a holding chamber.

Referring now to FIG. 5, module HM shown therein operates in conjunction with a holding chamber HC. Loaded on the shelves or racks of this chamber are hot plates P containing cooked food. The holding chamber acts to maintain for a more or less prolonged period, the food in plates P in a hot and moist state in condition to be served. Thus whether a hot food plate remain in the holding chamber for a half hour or for three hours, in either case when taken out of the chamber the food in the plate is in condition to be served as if it had been just cooked. For this purpose, it is not only necessary that the food served be substantially hot, but also that its moisture content be unchanged from the time it was just cooked.

Holding chamber HC is similar in most respects to proofing chamber M shown in FIG. 1, and is provided with a feed duct FD into which is fed a stream of hot, humid air exhausted from outlet 15 of module HM. Chamber HC also includes a return duct RD to return to intake 14 of the module the hot and humid air forming the atmosphere of the holding chamber.

Module HM is the same structurally in all respects as module M in FIG. 1, except for one significant feature to be later described, and it operates in a similar manner. Module HM includes an air duct 19 in which is disposed the motor-driven blower 20 and the electrical air heater element 21. Air intake 14 to duct 19 is coupled to return duct RD of the holding chamber. Thus the air sucked into duct 19 through intake 14 by blower 20 is blown through heater 21 to produce a hot air stream that is exhausted through outlet 15 of the duct. The pressure-differential action of blower 20 is such as to produce in inlet 14 of the duct in advance of the blower a low pressure in a zone Zn which acts to suck air into the duct drawn from return duct RD of holding chamber HC. In the region of duct 19 beyond blower 20 there is created a positive pressure zone Zp. This acts to drive the heated air toward outlet 15 from which it flows into feed duct FD of the holding chamber.

Injected into positive-pressure zone Zp in duct by means of a steam tube 34 coupled to steam chamber 33 of the steam generator is steam which intermingles with and humidifies the hot air stream. The temperature of the air flowing through the duct is adjusted by varying the power applied to electric air heater 21. The amount of steam that is generated and consequently the relative humidity is adjustable by varying the power applied to water heater 28 in the steam generator.

Since steam ejected from steam tube 34 coupled to steam chamber 33 in the steam generator is under positive pressure and is injected into positive-pressure zone Zp in this duct, this limits the amount of steam that can be entrained in the hot air stream in the positive pressure zone.

When the temperature of the hot air stream is no higher than about 130° F. for use in a proofing operations, the amount of steam then injected by tube 34 into the positive-pressure zone Zp is sufficient to obtain the high relative humidity then necessary for a proofing action.

But when in order to obtain a holding action, the temperature of the air stream is turned up to a level in the range of about 140° F. to 180° F., then in order to obtain at this elevated temperature a high relative humidity suitable for holding operation, the amount of steam provided by steam tube 34 may then be inadequate.

In order to provide sufficient steam to operate the module in conjunction with holding chamber HC in which the air stream is heated to a higher temperature level than in a proofing operation, there is provided an auxiliary steam tube 50. Tube 50 extends from the steam chamber 33 of the steam generator 18 to the low-pressure zone Zn in advance of blower 20 in the duct intake 14.

Because of this low pressure, steam is drawn through auxiliary tube 50 from steam chamber 33 at a far greater flow rate than steam is taken from steam chamber 33 by the first steam tube 34 coupled to the positive-pressure zone Zp. A valve V is interposed in auxiliary steam tube 50 preferably as a shut-off valve, but can be used to adjust the steam flow.

To increase the temperature of the air in the air stream flowing through the duct, one adjusts the power applied to the electric air heater element 21 so that the temperature is at the desired level. And to increase the amount of steam being generated, one increases the amount of power applied to water heater unit 28 in the steam generator so that for a given air temperature, the relative humidity is at the desired level.

When module HM operates in conjunction with a proofing chamber in the manner shown in FIG. 1, the air temperature then need to be no higher than 130–F., and to then obtain a high relative humidity, it is only then necessary to operate the module with the first steam tube 34. In operating in a proofing mode, valve V is then closed, for when open, it then provides an amount of steam which may be excessive in the proofing mode.

In the holding model valve V is partially or fully opened to provide sufficient steam at the elevated temperature at which the module then operates to produce the desired percent of relative humidity.

If a module in accordance with the invention is to be used only in conjunction with a proofing chamber1 there is then no need for the auxiliary steam tube 50. If the module is to be used only in conjunction with a holding chamber, then the auxiliary steam tube 50 is necessary but the first steam tube 34 is optional. In practice therefore a module that only includes auxiliary tube 50 can be used for either a proofing or a holding operation.

Instead of an auxiliary tube 50 having a valve therein to feed steam from steam generator 18 into low-pressure zone Zn in intake 14 to the blower as shown in FIG. 5, other means may be used for this same purpose. Thus one may include in the module a duct coupling an opening in the cover of the steam generator to the intake 14, in air duct 19, the opening being provided with an adjustable shutter acting as a valve.

Variable Water Capacity Module

In the modules shown in FIGS. 2 and 5, water reservoir 17 is coupled by feed pipe 27 to the water pan 26 of steam generator 11. As a consequence, the water capacity of the reservoir and the water capacity of the separate steam generator are predetermined by their dimensions and cannot be varied.

As previously noted, the humidity and temperature conditions necessary to operate in a proofing mode differ from those required when operating in a holding mode. Thus if it: becomes necessary in the holding mode to generate a large volume of steam, one needs for this purpose a steam generator having a large water capacity. But it one needs to generate steam quickly, since the steam generator is provided with a single electric heater to boil the water therein, then a smaller volume of water is required, for should the amount of water in the steam generator be large, it would take much longer for the electric heater to bring the water to its boiling point.

Figure 6:
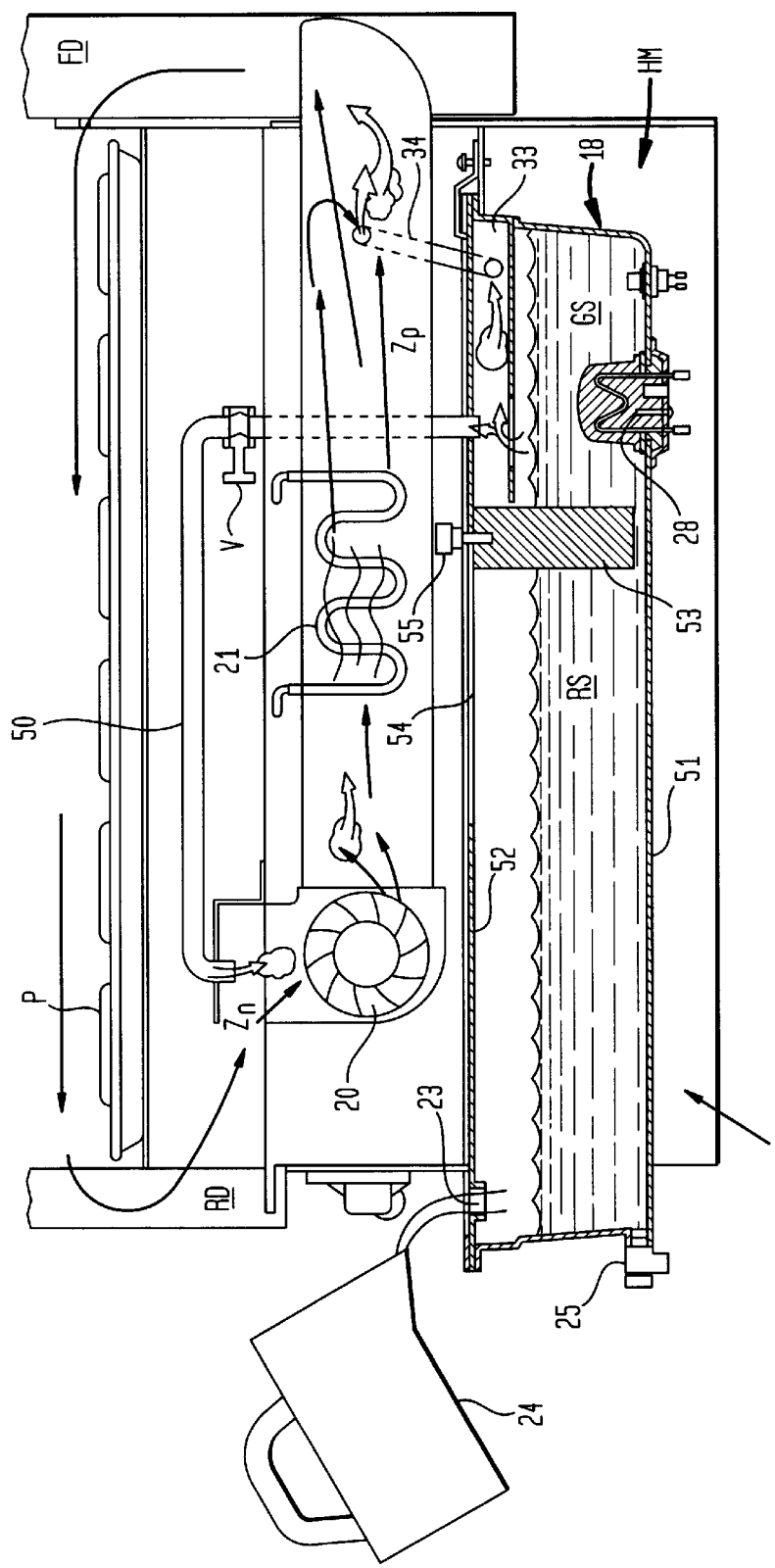
FIG. 6 shown a variable water capacity module.

In the modules shown in FIGS. 2 and 5, the respective water capacities of the water reservoir and of the separate steam generator are fixed and cannot be varied. As a result, these modules lack sufficient flexibility to fully satisfy the various conditions that are encountered in operating in either a proofing or holding mode. For example, if in a holding mode, the holding chamber is heavily loaded with cooked food in a very moist condition, the atmosphere necessary in this chamber to maintain the cooked food in condition to be served requires a large volume of steam, far greater than is necessary in a dough proofing operation. In order to provide a module having greater flexibility than the modules shown in FIGS. 2 and 5 which have a fixed capacity water reservoir and a separate fixed capacity steam generator, the module shown in FIG. 6 has a variable water capacity. To this end, in the module shown in FIG. 6, the water reservoir and the steam generator are integrated in a single, generally-rectangular tank 51 having a cover 52.

Tank 51 is divided into a reservoir section RS and a steam generator section GS by a movable barrier wall 53 having a rectangular cross section. Wall 53 depends from cover 52 to a level above the bottom tank 52 to create in the space between the lower end of the barrier wall and the bottom of the tank a water flow path that couples the water reservoir section RS to the steam generator section GS. As a result of this integration, the water level is the same in both sections, and as water is boiled off in the steam generator section, the level of water declines in both sections. Water is replenished in the water reservoir section RS in the module shown in FIG. 6 in the same manner as it is replenished in the modules shown in FIGS. 2 and 5.

Barrier wall 53 is shiftable in tank 51 within limits defined by a longitudinal slot 54 formed in tank cover 52. Barrier wall 53 is secured to cover 52 by a screw clamp 55 which extends through slot 54 and turns into a threaded bore in the upper end of the wall. Thus to shift barrier wall 53 in either direction in the tank, the screw clamp 55 is loosened to permit shifting of the wall to any desired position in the tank, and the screw clamp 55 is then tightened to maintain the set position. More preferably, the barrier fits snugly within the tank walls and so a clamping device per se is not required, in which case 55 is an arm through the slot that allows adjusting the position of the barrier along the slot.

When barrier wall 53 is shifted in the tank toward the left, this shift reduces the water capacity of reservoir section RS, and to the same degree it enlarges the water capacity of the steam generator section CS. A shift of the barrier wall toward the right results in a reverse reduction and increase of the water capacities. Thus by adjusting the position of barrier wall 53, one can reproportion the capacities of the respective sections of the module to attain conditions appropriate to the proofing or holding mode in which the module is to be operated.

In the proofing mode, it is usually desirable to shift barrier wall 53 to the right and thereby reduce the water capacity of steam generator section GS. This allows electric heater 28 in the steam generator section GS to more quickly boil the water in this section. A smaller quantity of water is easier to control when operating under temperature and humidity conditions appropriate for a proofing atmosphere. For operating in a holding mode, barrier wall 54 is then shifted to the left to increase the water capacity of steam generator section GS at the expense of the water capacity of the reservoir section RS. The larger quantity of water then in the steam generator section makes it possible to attain much higher levels of humidity as is needed for the higher temperatures required in a holding mode.

There is no one ideal setting of the barrier wall for operating in the holding mode or for operating in the proofing mode. Proper proofing mode settings depend on the nature of the dough being proofed and on how heavily loaded is the proofing chamber. For example, a dough having a significant fat (butter) content should be proofed at a lower temperature to avoid melting the fat, whereas a dough with a lower fat content can be proofed at a higher temperature. And the proper setting in the holding mode depends on the atmosphere required for the particular cooked food loaded into the holding chamber. The advantage of a variable water capacity module is that it is readily adjustable to accommodate the module to producing whatever atmosphere is required in operating in a proofing or holding mode.

A further embodiment is shown in FIGS. 7A, 7B, 7C, and 7D. In FIG. 7A, the tank 51 having a drain valve 25 is shown partially inserted (or partially removed) from an embodiment of the heating/proofing module M. As shown, the module has a housing 71 and a handled, hinged door 73 that can be opened to access shelves on which the held/proofed foodstuff material is stored. At the lower portion of the module are controls, for example: a knob 75 for setting the temperature, and an associated lamp 77 for indicating that the heater (for holding) is active; a knob 79 for setting the relative humidity, and again an associated lamp 81 for indicating that the proofing heater is active. Also shown, and explained further below, are lamps 83 and 85 indicating whether the module is in hold mode or proof mode. Lastly, a main power on/off switch 87 is provided, preferably having a lamp therein to indicate that power is being supplied to the module.

Figure 7B:
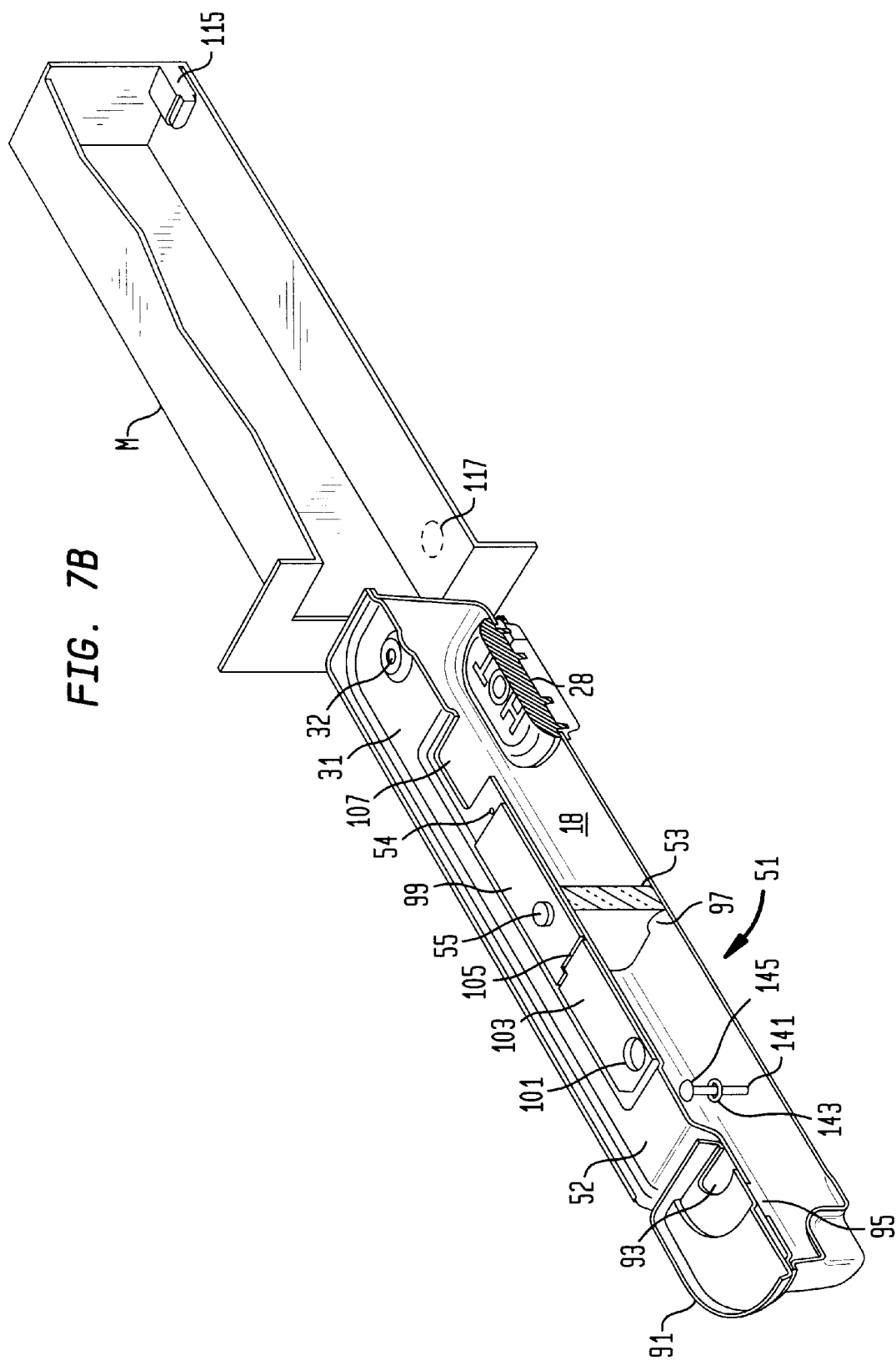
Figure 7C:
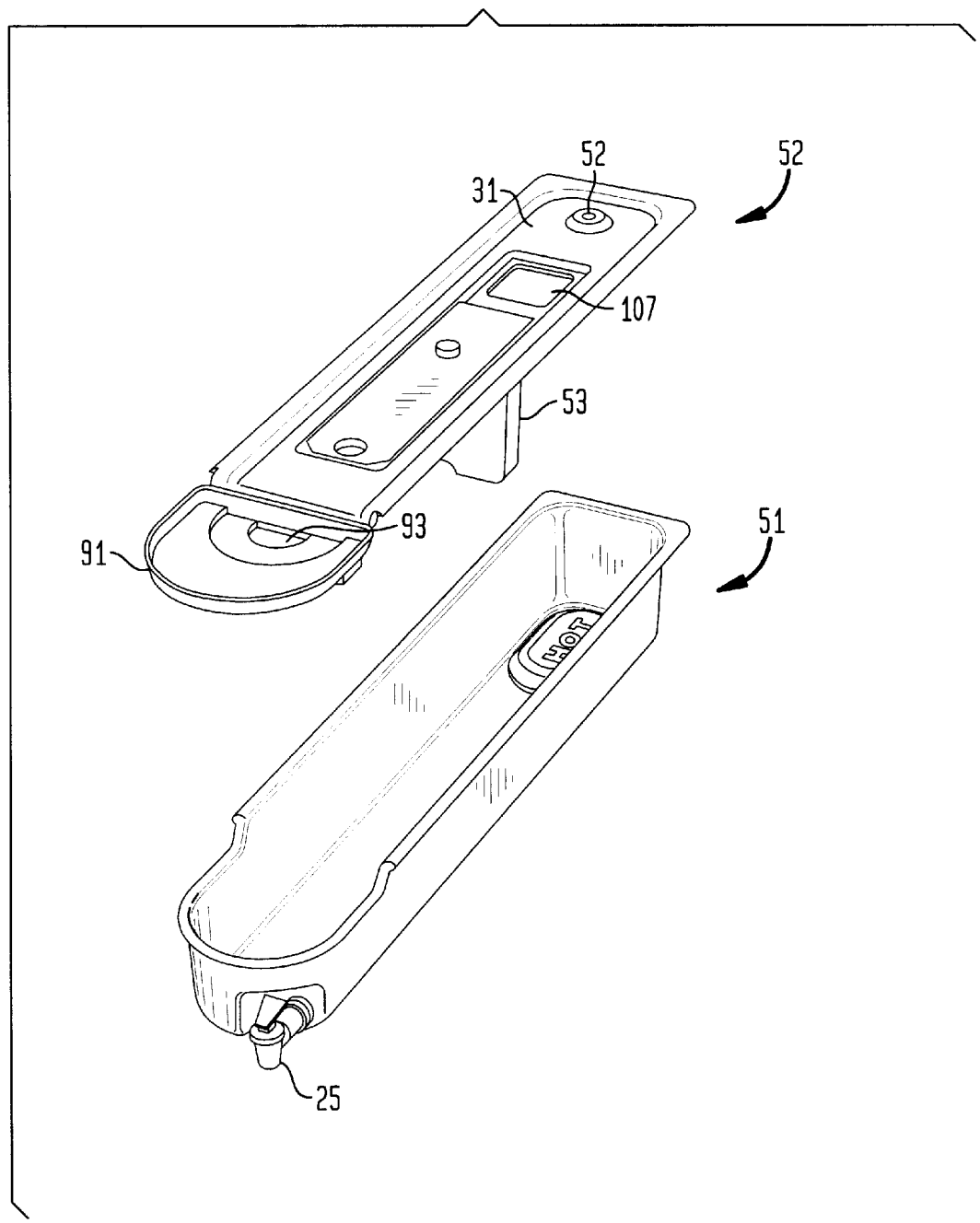

FIG. 7B depicts a cutaway perspective view of the improved tank shown partially inserted in the module in FIG. 7A. Towards the front of the tank 51 is a sliding fill pan 91 that can be used to fill the tank with water; the pan is slid forward (to the left in FIG. 7B) so that the opening 93 in the pan is disposed over a fill port 95 in the cover of the tank, and then water can be added via the fill pan. The barrier 53 separating the reservoir 17 from the steam generating portion 18 essentially completely fills the interior cross-section of the tank except for a seep hole 97 in the lower portion, which allows water from the reservoir to seep into the steam generating section. The barrier is slidable along the length of the tank via the channel 54 and is held therein by engagement of the knob 55 (e.g., a non-screw type, like the arm described above) with a panel 99. Sliding the panel along the channel is facilitated by a finger hole 101 in a hingeably joined (hinge 105) front section of the panel. The panel can be slide rearwardly to cover the port 107 by which steam is emitted to the low pressure zone. Thus, when the module is used for proofing, the steam opening to the low pressure zone is automatically closed by the panel covering it; and when the barrier is moved fully forward, the steam generating section has a significant amount of water (because the barrier is at the front end of the tank) and the port for emitting steam to the low pressure zone is uncovered by the panel. FIG. 7C is a perspective view of the tank and its lid.

Figure 7D:
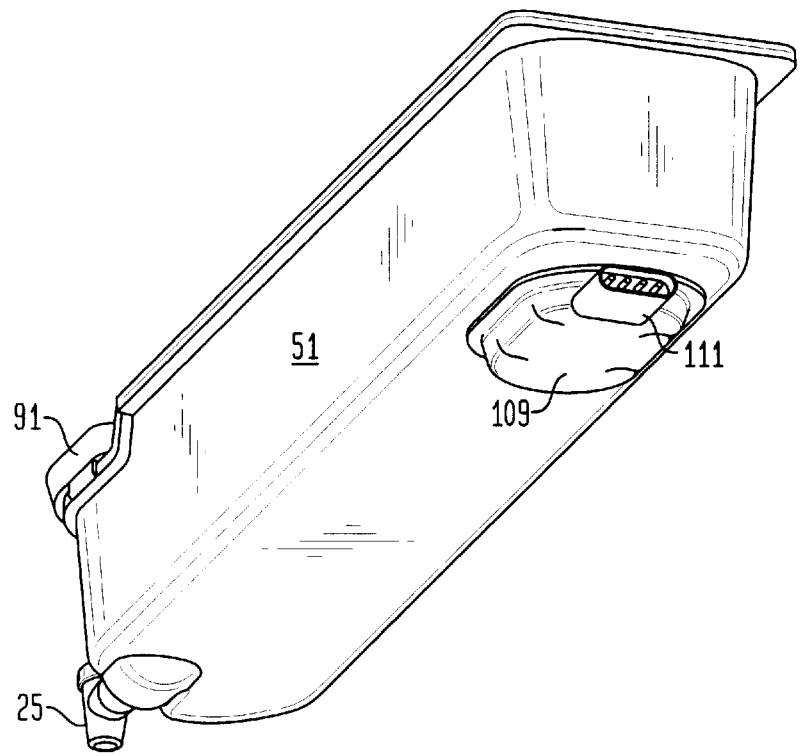

FIG. 7D is a bottom perspective view of the tank with the lid in place. The bottom portion of the heater is covered with a cap 109. An electrical connector 111 is provided so that the entire tank can be removed and replaced and the electrical connection can be made and disconnected merely by inserting and removing the tank. The connector engages a socket 115 (shown in FIG. 7B) in the back of the module M. Providing a completely replaceable tank provides a significant advantage because a used tank can be placed into a commercial washing machine (or washed by hand) without worry about any electrical connections. Similarly, if the steam generating heater fails, the tank can be replaced. The drain valve 25 can be eliminated, and then the user must pull out the tank to empty it, becoming aware of its condition and whether it needs to be cleaned. Still further, the tank can be removed without opening the door to the module, and thus the environment in the module is not disturbed if the tank is changed.

Figure 7E:
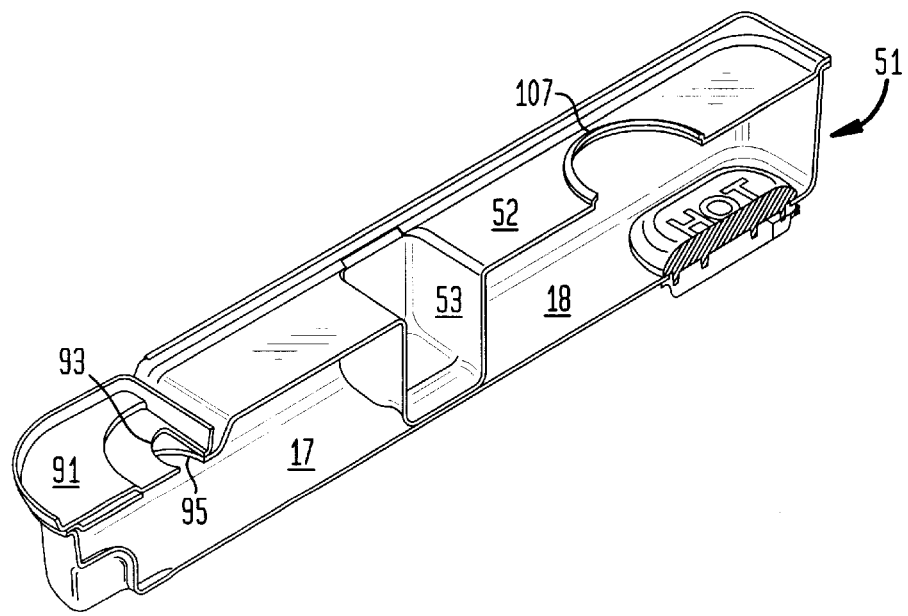
Figure 7F:
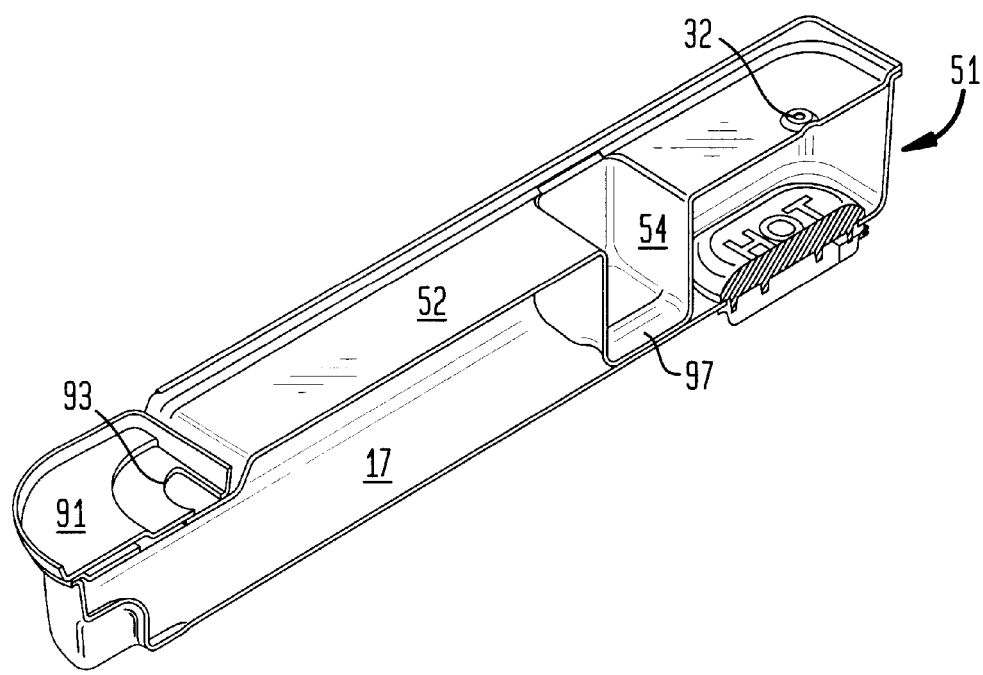

As noted herein, the present device can be used for solely proofing, solely holding, or for a combination of proofing and holding. When the device is to be used solely for proofing or holding, it may be easier to use a tank specifically designed for the task at hand. FIG. 7E depicts a tank and associated top used solely for holding. The barrier 53 is molded from the same sheet as the top 52 and is disposed about halfway along the longitudinal extent of the tank 51. The passage 97 by which water flows from the reservoir 17 to the steam generating section 18 is similarly molded into the top. When used solely for holding, steam is provided to the low pressure side and not to the high pressure side; accordingly, there is a single, large port 107 for exhausting steam to a conduit on the low pressure side of the blower. Also shown in FIG. 7E is the position of the fill pan 91 when slid forward, aligning the fill port 93 with an opening 95 in the top by which water can be added to the reservoir. On the other hand, when the instant module is to be used solely for proofing, a tank and top combination as shown in FIG. 7F can be used, wherein the barrier 54 is similarly molded into the top 52 and is disposed relatively towards the rear portion, reducing the steam generating area of the tank. Accordingly, when used solely for proofing, there is no need for a port to exhaust steam to the low pressure side, and so only the single port 32 is provided for exhausting to the high pressure side of the air conduit. Still further, it should be noted that the embodiments shown in FIGS. 7B, 7E, and 7F all use the same tank 51 and are provided with different tops 52. This enables the operator, or the establishment, to change tanks if there is a failure of a heating component, and to change the function of the module merely by changing the top. Further, for example, in the case where the module has a humidity control, the top shown in FIG. 7F can be equipped with a magnet attached to or molded into the top in the proper location effective to trip a barrier proof position sensor 121 (FIG. 8, described below) and cause operation of the device as a proofer; when that top is removed, that sensor is effected by the absence of a magnet and so the control system reverts to operating the module in holding mode.

Figure 8:
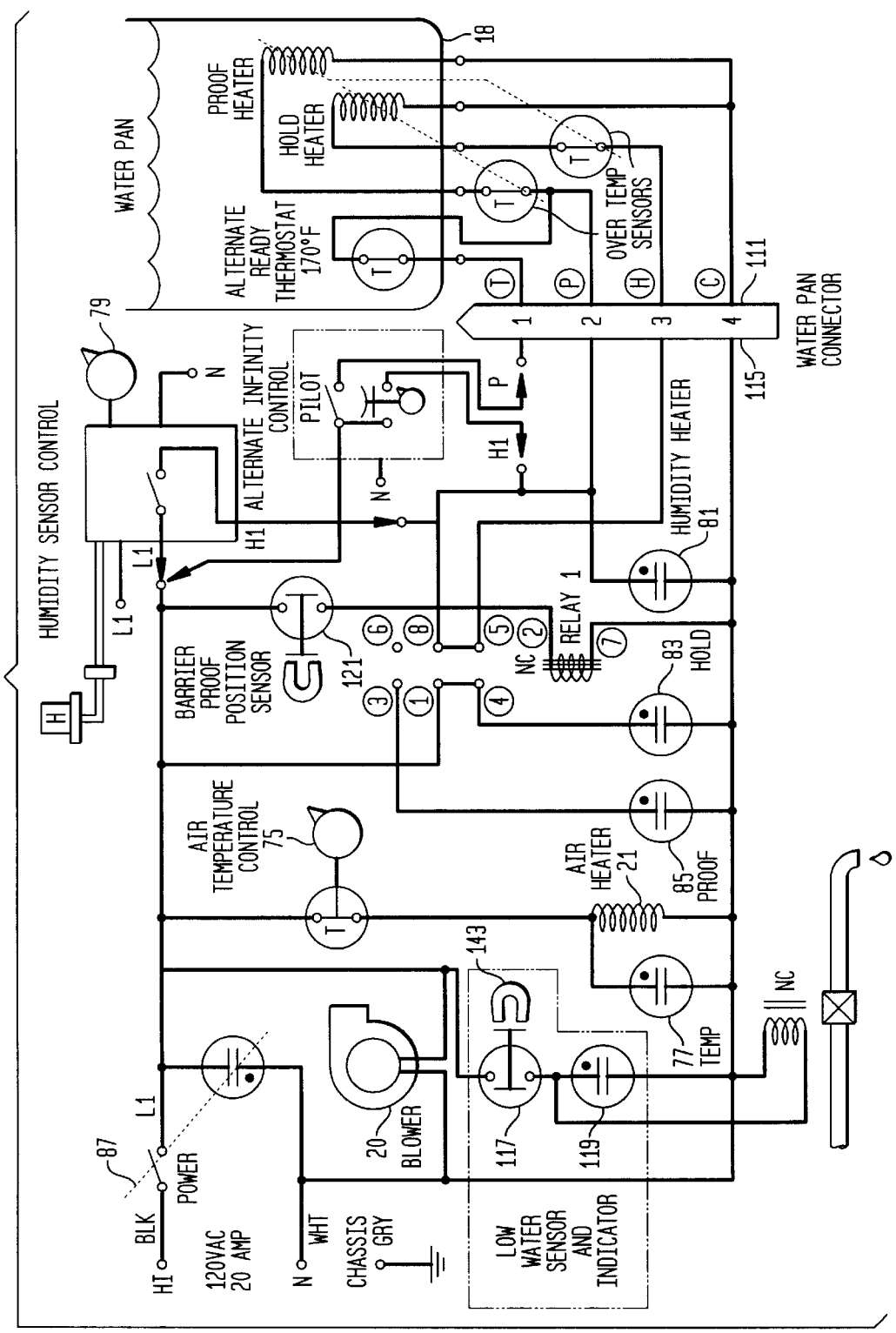
FIG. 8 is a schematic of a circuit for the overall control of the module.

A preferred control circuit is shown in FIG. 8. H1 is the on/off switch 87, which energizes the blower 20 at all times there is power. Power is also then supplied to the temperature control 75 which, when activated and below the set point, energizes the air heater 21 and the associated lamp 77.

Preferably disposed in the tank is a level float having a magnet and a magnetic switch 117 is disposed in the module under the tank near the float; the tank is thus preferably of a non-magnetizable material. When the water level is low, the switch is energized and an associated lamp 119 (and/or an alarm buzzer) is energized to warn the operator of a low water condition. In another embodiment, the tank can be automatically filled by providing an opening in the back of a module through which a water pipe (not part of or attached to the module) with an electrically actuated valve extending to near the front of the tank. Disposed in (or molded into) the tank is a rod 141 having a float 143 in which a magnet is embedded or otherwise attached; the top of the rod has a cap 145 to prevent the float from coming off the rod, and the cap is preferably removable to allow cleaning of the float. Disposed in the module floor adjacent where the float in the tank would be positioned when the tank is inserted is the magnetic switch or sensor 117. When the water level is low, the magnet in the float is sufficiently close to the sensor that the valve is actuated in place of or in addition to the lamp. The valve is preferably normally closed, so that if the tank is removed the valve will not feed water; and if the tank is removed while filing (e.g., if the operator does not notice the fill lamp being on), the water flow will stop. When sufficient water has been added (the float and magnet rise), the magnet will be at a distance sufficiently far from the switch that the switch will shut off the water flow. By having the float level in the reservoir section of the tank, turbulence from the boiling water in the steam generating section is damped by the barrier and thus is unlikely to give rise to spurious low level warnings or uncontrolled cycling of water added automatically. As shown in the schematic, there are two overtemp sensors, one associated with each heater, to avoid burning out the heater if the water level is too low or heat transfer away from the heater is otherwise inhibited.

Returning to the schematic in FIG. 8, powering on also provides power to the humidity control circuitry associated with the switch 79 on the front of the module as shown in FIG. 7A. Power is provided to the poles of Relay 1, shown in its normally closed (NC) position, and through a barrier proof position sensor switch 121. Similar to the aforedescribed sensor for the automatic filling of the tank with water, a magnet is embedded in the barrier 53 or the associated screw clamp 55 or thereabouts. A magnetic sensor is provided in the module in a fixed position above the position where the barrier (more particularly, the magnet associated therewith) would be located when the barrier is moved rearward, essentially closing off the steam port to the low pressure zone and defining a configuration where the module is intended to be used for proofing. As shown the relay is in the NC position where power is provided to the hold lamp 83, the proof lamp 85 is off, and power is provided through the relay to both the proof heater and the hold heater as shown in the water pan. When the barrier is moved into a position to effect proofing, the magnet associated with the barrier closes the sensor switch 121, which opens the Relay 1 to turn on the proof lamp and turn off the heat lamp, and removes power from the hold heater while maintaining power to the proof heater. A humidity sensor is preferably disposed in the module environment proper, and less preferably in the passage 19, which effects whether power is supplied to the proof heater. Accordingly, with this preferred type of circuitry and structure, the operator need not change or attend to the control knobs on the front of the module, but merely need to move the barrier position to change the function of the module from holding to proofing. Likewise, moving the barrier towards the front re-enables the hold heater.

FIG. 8 also shows an alternate, less preferred humidity control scheme for a module not having a humidity control sensor. In this case, when proofing is desired, the "alternate infinity control" is set to a preferred duty cycle for the proofing heater; e.g., on 60% of the time and off 40% of the time. The humidity in the module is controlled, roughly, by changing the duty cycle. However, when the unit is first started, or the water in the steam generating portion of the tank is otherwise fairly below boiling, it will be very difficult for the water to reach a steam generating temperature with such a duty cycle. Accordingly, when this type of control is used, an "alternate ready thermostat" is shown positioned in the steam generating section of the tank. This thermostat is preset (170° F. is shown) to maintain the water in that section at a sufficiently high temperature to generate steam when the duty cycle is on. Thus, for example, when the tank is first inserted and proofing is desired, the water is cold. The alternate ready thermostat causes the alternate infinity control to energize the proofing heater until the water temperature reaches the desired set point (e.g., 170° F.). Thereafter, the proofing heater is energized depending on the duty cycle set.

Figure 9:
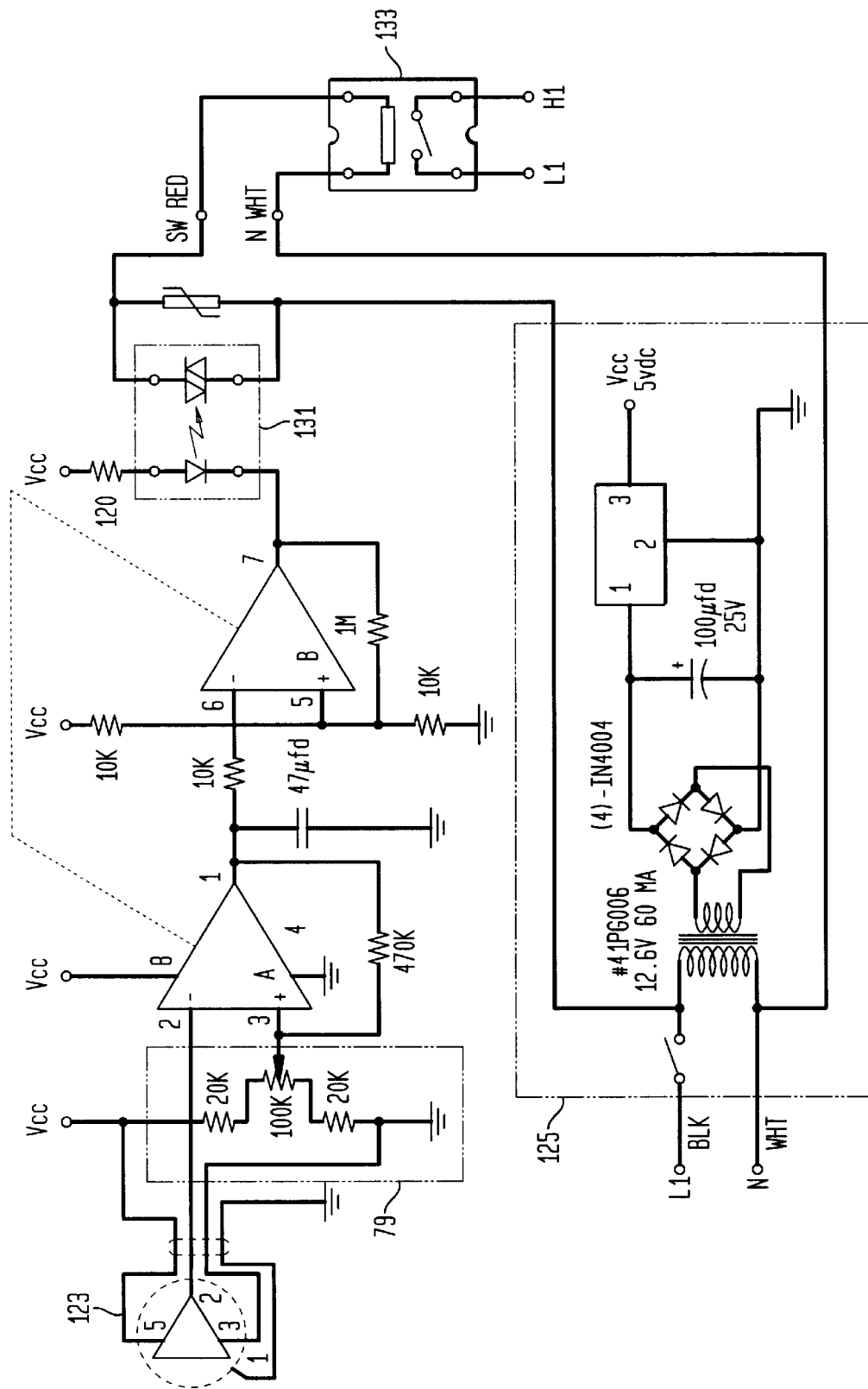
FIG. 9 is a schematic of a circuit for the humidity control of the module.

FIG. 9 depicts a preferred embodiment of a humidity control circuit for use in the general control circuitry shown in FIG. 8. The humidity control pot 79 enables the operator to select a set point for control. Preferably, setting a humidity control set point greater than 0% provides power to the system through the power supply 125 and the output side of the humidity control relay; that is, if the humidity control is set off, the system is effectively powered down. The set point indicated on the pot 79 is compared with the reading from the humidity sensor 123 in comparator 127, the comparator signal being buffered 129. If the set point and control variable (humidity) indicate that the proof heater needs to be energized because the humidity is too low, the buffered output signal energizes an optoelectric switch 131, which then activates an electronic relay 133 to provide power to the proof heater. When sufficient steam has been added, the comparator output drops, the optoelectric signal drops out, and the relay is deactivated.

As described, this invention contemplates a module for holding alone, for proofing alone, or, most preferably, for both holding and proofing. For any of these operations, it is most preferred that the tank be removable. Thus, more costly models will have removable tanks, with the ability to do holding and proofing, and will have the preferred automatic control system for determining by the position of the barrier whether holding or proofing is desired, and especially with automatic tank refilling. Less costly models will have the ability to do only holding or only proofing, with more limited control mechanisms, and may have a fixed barrier. Additionally, a single electronically controllable variable resistance heater could be used instead of the separate holding and proofing heaters (i.e., a single heater, controllable, can be used instead of two). To facilitate modifying the configuration merely by changing the top of the tank, the tops are preferably marked with "PROOF", "HOLD", or "PROOF/HOLD" or similar terminology to enable the user to quickly and accurately choose the correct top for the tank; the marking can be printed or imprinted thereon, or can be molded directly into the top.

While there has been shown and described preferred embodiments of a module for producing hot, humid air, it will be appreciated that many changes and modifications may be made thereto without, however, departing from the essential spirit thereof. For example, other heat sources, such as gas (butane, propane, LPG, natural gas), can be used to heat the air in the duct and/or the water in the steam generating section, or microwave energy can be used to heat or proof the foodstuffs. The module can be built in, the tank can be removable, or the entire module can be removable. Likewise, the module can be positioned at the bottom, top, or side of the holding/proofing chamber, and the tank can be positioned as desired (e.g., FIG. 3 has the tank on the right side, FIG. 7A has the tank on the left side). While the air circulation has been shown as front to back, it can be from back to front or from side to side. In a preferred embodiment, the duct inlet passes over the port 107 and has an opening so that when the port is opened steam passes into the air stream in the duct and that stream then passes to the blower; in such a case, a separate conduit for bringing the steam to the low pressure side of the blower is not needed. Thus, the duct can comprise various manifolds as needed to direct the air stream where desired. Similarly, the outlet of the duct can be made to pass over the proofing port 32. My prior U.S. Pat. Nos. 5,782,174 and 5,802,963 are incorporated herein by reference for all purposes; for example, the cover of the heater can be coated with TEFLON or a similar substance to diminish scaling.

I claim:

1. A module adapted to generate a stream of hot, humid air useable in conjunction with a dough proofing chamber or a cooked food-holding chamber to provide an atmosphere appropriate to the chamber; said module comprising:
   A. an air duct having an air intake and an air outlet;
   B. a blower disposed in the duct to blow a stream of air drawn from the inlet to the outlet, said blower creating in advance thereof in the duct a low-pressure zone, and creating therebeyond a positive-pressure zone;
   C. an electric air heater in the duct to heat the stream of air;
   D. a steam generator comprising a tank for holding water, a water heater for heating water held therein, and a connector for electrically connecting the water heater to a power supply, said steam generator being attachable to and removable from the module;
   E. a receptacle for engaging the connector means; and
   F. means for feeding steam generated in the tank into the duct to provide said atmosphere of a hot, humid air.

2. The module of claim 1, wherein said means for feeding steam to the duct feeds steam to the low-pressure zone.

3. The module of claim 1, wherein said means for feeding steam to the duct feeds steam to the positive-pressure zone.

4. The module of claim 1, wherein said means for feeding steam to the duct feeds steam to both the low-pressure zone and the positive-pressure zone.

5. The module of claim 4, wherein the steam generator includes two water heaters.

6. The module of claim 1, wherein the tank has a barrier wall disposed therein separating a steam generating area from a reservoir area while maintaining fluid communication between said two areas.

7. The module of claim 6, wherein the tank has a longitudinal extent, and wherein the tank further comprises means for selectively positioning the barrier at a given position along said longitudinal extent.

8. The module of claim 1, further comprising means for adjusting the power supplied to said electric air heater to vary the temperature of the air stream in the duct.

9. The module of claim 1, further comprising means for adjusting the power supplied to said water heater to vary the amount of steam produced by the steam generator.

10. The module of claim 6, in which said barrier wall depends from a cover on the tank to create a flow space between a lower end of the wall and a bottom of the tank.

11. The module of claim 6, wherein the tank comprises two separate ports for providing steam.

12. The module of claim 6, wherein the tank further comprises a fill pan slidable along a portion of the longitudinal extent of the tank.

13. The module of claim 6, wherein the tank further comprises a drain valve.

14. The module of claim 6, wherein the barrier wall includes a magnet, and wherein the module further comprises a magnetic sensor effective to sense when said barrier wall is disposed in a position where the module is to be used for proofing.

15. The module of claim 1, further comprising a means for measuring the water level in the tank.

16. The module of claim 5, further comprising a sensor for each heater to determine if each heater is too hot.

17. The module of claim 1, further comprising means for controlling heat added to the air in the duct.

18. The module of claim 1, further comprising means for controlling the moisture added to the air in the duct.

19. The module of claim 18, further comprising a humidity sensor.

20. The module of claim 15, further comprising means for automatically adding water to the tank.

21. The module of claim 6, wherein the steam generator comprises a top for the tank, said top having molded thereinto a barrier and a port for exhaust of steam.

22. A method for holding and/or proofing food in a chamber, comprising:
   A. providing an air duct in fluid communication with said chamber and forcing air through the duct to circulate air from and to said chamber;
   B. heating, in a controlled manner, the air passing through the duct;
   C. providing a removable tank divided into a reservoir section and a steam generating section;
   D. heating, in a controlled manner, the water in the steam generating section of the tank; and
   E. conducting steam generated to the air duct.

23. The method of claim 22, wherein the tank comprises a movable barrier dividing said sections, and automatically changing the function of the chamber between proofing and holding as a function of the position of the barrier.

24. The method of claim 22, further comprising sensing the level of the water in the tank and automatically adding water as a function of the level.

25. The method of claim 22, wherein the tank comprises a top, said method further comprising: providing at least two tops, each having a fixed barrier dividing said sections, each said barrier being in a different physical location with respect to the length of the tank, and each top having a different configuration of one or two ports for steam to be conducted; and changing the function of the chamber between proofing and holding as a function of the particular top placed on the tank.

* * * * *